United States Patent [19]
Hardee et al.

[11] Patent Number: 4,469,152
[45] Date of Patent: Sep. 4, 1984

[54] DUST-TIGHT HATCH CLOSURE ASSEMBLY

[75] Inventors: Carl L. Hardee; Robert E. Wagner, both of Ottawa, Ill.

[73] Assignee: Borg-Warner Chemicals, Inc., Parkersburg, W. Va.

[21] Appl. No.: 88,241

[22] Filed: Oct. 25, 1979

[51] Int. Cl.³ .............................................. B67C 5/37
[52] U.S. Cl. .................................. 141/312; 141/287; 141/392; 277/343; 285/97
[58] Field of Search ............... 141/287, 312, 372, 392; 277/34, 34.3; 285/97, 107, 109

[56] References Cited
U.S. PATENT DOCUMENTS

| | | | |
|---|---|---|---|
| 2,178,494 | 10/1939 | Richardson | 141/312 |
| 2,832,378 | 4/1958 | Beavon | 141/287 |
| 3,103,958 | 9/1963 | Rath | 141/312 X |
| 3,650,420 | 3/1972 | Mahaney | 141/312 X |
| 3,683,976 | 8/1972 | Remane | 141/287 X |
| 3,722,895 | 3/1973 | Mevissen | 277/34.3 |
| 3,830,267 | 8/1974 | Cass | 141/287 |
| 4,098,308 | 7/1978 | Purdum | 141/312 X |

Primary Examiner—Stephen Marcus
Attorney, Agent, or Firm—R. J. Schlott

[57] ABSTRACT

A dust-tight hatch closure assembly for filling railway covered hopper cars having a filling means and a pneumatic seal in the form of an inflatable annulus.

1 Claim, 1 Drawing Figure

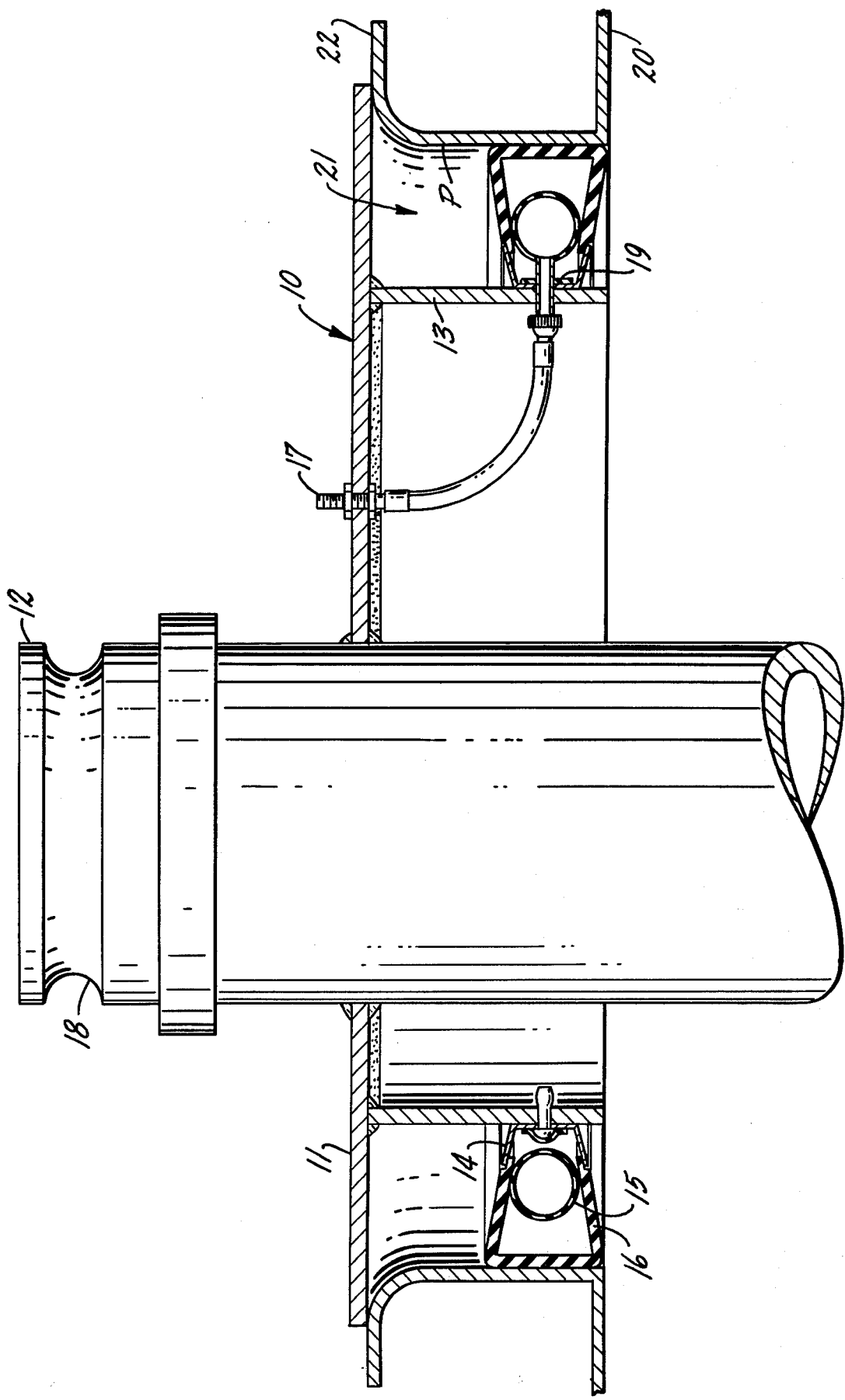

DUST-TIGHT HATCH CLOSURE ASSEMBLY

BACKGROUND OF THE INVENTION

The present invention relates to a hatch closure assembly for use in filling railway covered hopper cars. More particularly, the present invention relates to a dust-tight hatch closure assembly having a filling means and a pneumatic seal means adapted to prevent the escape of dust during filling operations.

In the loading of particulate solids and powders through the hatches of a hopper car dusts are vented out the open hatchways and escape into the surrounding atmosphere. In addition to creating a nuisance and an air pollution problem, these dusts may become hazardous, forming explosive or flammable mixtures, thus endangering the safety of personnel and equipment. Methods for abating the venting of this dust into the atmosphere have included surrounding the fill tube, hopper or conduit and the hatch with a shroud formed of canvas or other flexible material, and providing the hatch with a lid frequently secured by clamping means and including a fill port or aperture to reduce the area available for venting dust. These methods require that the operator position the shroud or lid carefully and secure the shroud or lid in place with bolts or other clamping means to attain an effective closure, and are thus time consuming to employ and may be subject to inadequate operation through operator inefficiency and neglect.

SUMMARY OF THE INVENTION

The present invention provides a dust-tight hatch closure which is easily and quickly positioned and which provides a positive seal without bolts or other clamping means to prevent the venting of dust from the hopper car into the surrounding atmosphere.

BRIEF DESCRIPTION OF THE DRAWINGS

In the FIGURE there is shown in cross-section the loading hatch of a railway covered hopper car, together with the hatch closure assembly of the present invention in operative position.

DETAILED DESCRIPTION OF THE PREFERRED EMBODIMENT

In the FIGURE there is shown in cross-section a cover hopper car hatch 20 having an edged opening 21, and a hatch closure assembly 10, consisting of a hatch lid 11 resting on rim 22 of said edged opening 21. Lid 11 is shown in the form of a metallic plate through which extends a filling conduit fill tube 12 having a vapor-tight connection with lid 11 achieved by welding or the like, and a cylindrical support member 13 fastened to said lid 11 and extending through edged opening 21, surrounding conduit 12. Outwardly-directed channel member 14, shown in the form of a tire rim, surrounds support member 11 and is fastened thereto. An inflatable annulus 15 which may be an ordinary inner tube, surrounds said channel member, and protective covering 16, which may be an ordinary tire, surrounds said inflatable annulus 15 and engages said channel member 14. Means 17 are provided for inflating and deflating said inflatable annulus.

Lid member 11 rests on the rim 22 of the edged opening 21 and supports the assembly. The channel member 14 holds and positions inflatable annulus 15 and protective covering 16; inflatable annulus 15 together with protective covering 16 forms the dust tight seal when pressurized and expanded to contact the edge of the hatch; and protective covering 16 provides an abrasion resistant outer covering for inflatable annulus 15, thus preventing abrasion and damage to the inflatable annulus 16 by contact with rough hatch edges, tools and the like. It will be appreciated that channel member 14, inflatable annulus 15 and protective covering 16 are positioned on support member to contact the inner periphery P of the edged opening 21 upon inflation of the inflatable annulus.

In the filling operation, the hatch closure assembly 10 with filling conduit 12 connected through coupling means 18 to a suitable supply source (not shown) is first inserted within the edged opening 21 of a covered hopper car hatch 20, with the inflatable annulus 15 in a deflated condition. Through means 17, inflatable annulus 15 is inflated to a suitable pressure such as 10-75 psig to expand it, firmly pressing the surface of protective covering 16 against the edge of the hatch to form a dust-tight seal. During the filling operation, the seal prevents the air displaced from the hopper car together with dust and suspended particles from escaping into the surrounding atmosphere by way of the hatch opening, constraining the displaced air to move counter currently through the feed conduit and into the supply source. At the end of the filling operation, the inflatable annulus 15 is deflated and the hatch cover assembly 10 is removed from the hatch 20.

A hatch closure assembly was constructed according to the practice of the invention as set forth herein above, employing as the channel member 14 an ordinary bicycle tire rim. The rim was fastened to support member 13 by riveting, and an elastic band 19 was fitted over the inner portion of the rim to protect the inflatable annulus from contacting the rivet heads. An inflatable annulus 15, in the form of an ordinary bicycle inner tube and a protective covering 16 in the form of an ordinary bicycle tire were fitted to the rim in the conventional fashion and connect through the inner tube inflation means to an ordinary valve stem extension to form means 17, passing through lid 11, for inflating and deflating the inner tube. The completed assembly was employed successfully to fill a railway hopper car with powdered plastic resin, the inflated seal acting to prevent the escape of dust into the surrounding atmosphere.

We claim:

1. A dust-tight hatch closure comprising an assembly of a lid, fill tube extending through said lid and joined thereto in a vapor-tight seal relationship, cylindrical support member joined to said lid in a vapor-tight relationship and surrounding said fill tube, outwardly-directed channel member attached to and surrounding said cylindrical support member, said channel member being a tire rim, an inflatable annulus surrounding and received by said channel member, said inflatable annulus being an inner tube, a protective covering surrounding said annulus and engaging said channel member, said protective covering being a tire, and means for inflating and deflating said inflatable annulus.

* * * * *